United States Patent
Bisland

(10) Patent No.: US 6,817,446 B1
(45) Date of Patent: Nov. 16, 2004

(54) ELECTRICALLY HEATED TREE STAND

(76) Inventor: Robert M. Bisland, 14509 - 85th Ave., Court West, Taylor Ridge, IL (US) 61284

( * ) Notice: Subject to any disclaimer, the term of this patent is extended or adjusted under 35 U.S.C. 154(b) by 0 days.

(21) Appl. No.: 10/409,536

(22) Filed: Apr. 8, 2003

(51) Int. Cl.[7] .............................................. A01M 31/00
(52) U.S. Cl. ....................................................... 182/187
(58) Field of Search ................................ 182/135, 136, 182/187, 188, 116

(56) References Cited

U.S. PATENT DOCUMENTS

| | | | |
|---|---|---|---|
| 3,419,108 A | | 12/1968 | Mobbs |
| 3,725,640 A | * | 4/1973 | Kunz .......................... 392/368 |
| 3,990,536 A | * | 11/1976 | Wilburn ....................... 182/20 |
| 4,022,292 A | * | 5/1977 | Van Gompel ................. 182/33 |
| 4,069,891 A | | 1/1978 | McClung |
| 4,410,066 A | | 10/1983 | Swett |
| 4,874,921 A | * | 10/1989 | Gerbig, Jr. ................... 219/202 |
| 5,454,060 A | * | 9/1995 | McDermott .................. 392/383 |
| 5,463,203 A | * | 10/1995 | Moore ......................... 219/202 |
| 5,516,189 A | | 5/1996 | Ligeras |
| 5,986,243 A | * | 11/1999 | Campf ......................... 219/529 |
| 6,222,987 B1 | * | 4/2001 | Duke et al. .................. 392/383 |

* cited by examiner

Primary Examiner—Alvin Chin-Shue
(74) Attorney, Agent, or Firm—Sturm & Fix LLP

(57) ABSTRACT

A tree stand including a platform adapted to be attached to a tree so that the platform is approximately horizontal whereby a hunter can stand on the platform. A heating element is operatively attached to the platform in a place below where the hunter can stand on the platform. An electrical battery is operatively attached to the heating element for selectively causing the heating element to experience a significant rise in temperature, thereby heating the feet of the hunter and melting snow or ice that may be present on the platform.

15 Claims, 2 Drawing Sheets

ELECTRICALLY HEATED TREE STAND

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates generally to tree stands and more particularly to a tree stand with an electrically heated platform.

2. Description of the Related Art

Hunting for big game, such as deer, is often done from a tree stand for strategic reasons. Commonly, such hunting occurs during cold weather when the big game animals are active. In order to be successful, the hunter must limit the amount of movement while in the tree stand. When a hunter is cold, he tends to move more often. Also, if the hunter is cold, the experience is less pleasant, so the hunter is more likely to stop hunting sooner than he might otherwise do.

One of the first parts of the human body to become cold when standing or sitting for long periods of time is one's feet. If the feet can be kept warm, the comfort level of the hunter is dramatically increased.

Heating devices which burn fuel are unacceptable for providing heat in a tree stand. This is due primarily to the fact that big game, such as deer, have an acute sense of smell and would immediately sense the presence of the by-products of combustion. Other heating devices, such as packets of chemical materials which become warm when exposed to ambient air, are expensive and are difficult to use to keep a hunter's feet warm.

Another problem is that sometimes when it rains or snows, the platform of a tree stand is slick and poses a safety problem for that reason.

Accordingly, there is a need for practical ways to keep a hunter's feet warm and the hunter as safe as possible while the hunter is using a tree stand.

SUMMARY OF THE INVENTION

The present invention relates to a tree stand including a platform adapter to be attached to a tree so that the platform is approximately horizontal whereby a hunter can stand on the platform. A heating element is operatively attached to the platform in a place below where the hunter can stand on the platform. An electrical battery is operatively attached to the heating element for selectively causing the heating element to experience a significant rise in temperature, thereby heating the feet of the hunter.

An object of the present invention is to heat a tree stand platform in a place where a hunter's feet would be on such platform.

Another object of the present invention is to provide a solution to the problem of keeping a hunter's feet warm while in a tree stand.

Another object of the present invention is to provide a heat warming device which is practical and inexpensive.

A still further object of the present invention is to provide a practical source of energy for heating a tree stand platform.

Another object is to be able to easily melt ice or snow from a tree stand platform for safety purposes.

A still further object of the present invention is to provide a switch for conserving energy of the battery.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
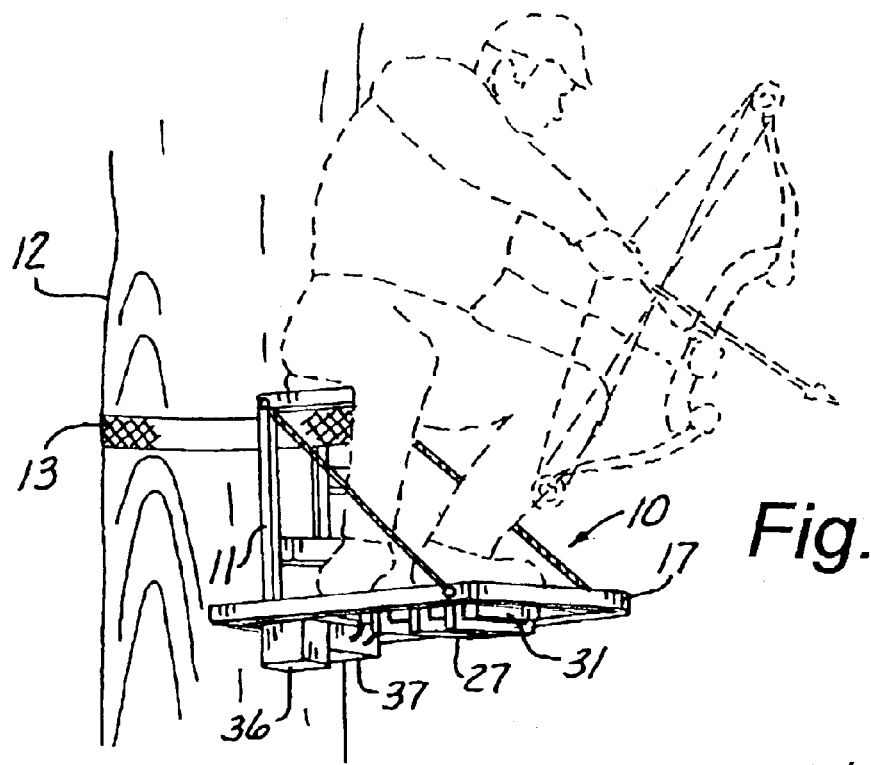
FIG. 1 shows a tree stand attached to a tree and has a hunter in dashed lines in the tree stand.

Referring now to the drawings wherein like reference numerals designate identical or corresponding parts throughout the several views, FIG. 1 shows a tree stand (10) constructed in accordance with the present invention which includes a frame (11) which is attached to a tree (12) with a nylon strap (13). A seat (14) is pivotally attached to the top of the frame (11), although it could be fixed and not pivot. A cushion portion (16) is attached to the top of the seat (14) and is optional.

A platform (17) is pivotally attached by bolts (18) to the frame (11) so that the tree stand is made more easily portable for transport from place to place, but such pivoting is not a requirement of this invention.

The frame (17) has a plurality of structural members (23) and (24) which form somewhat of a rectangle, although this shape can be many different shapes and this invention is not restricted to such rectangular shape. There are also cross members (26) which are welded or bolted to structural members (21) and (23). In the embodiment shown, there are three structural cross members (27) which are shaped to form a recess for a reason which will be explained below.

Figure 4:
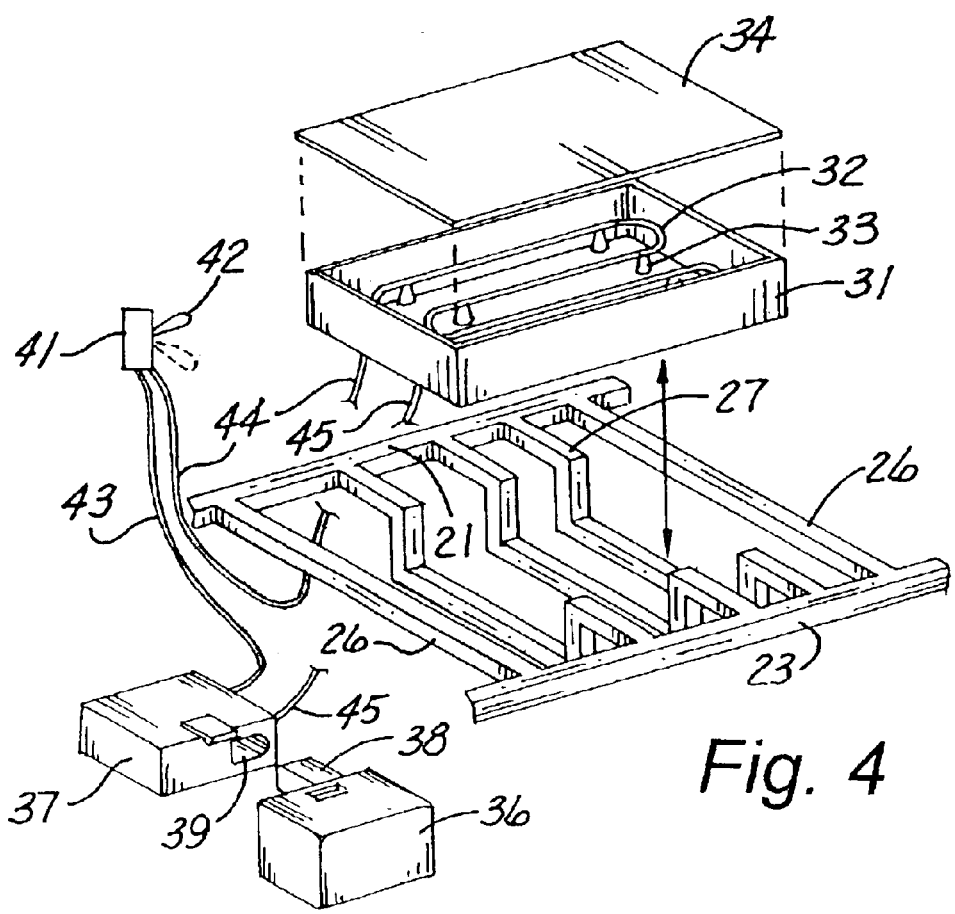
FIG. 4 is a partial exploded view of the platform, the heating element, the container for the heating element and the electrical system for heating the heating element.

Referring now to FIG. 4, a container (31) which is preferably molded of plastic in order to be a low heat transfer container, has a heating element (32) disposed therein which is held up by spacers (33). A top (34) closes the container (31) and is preferably made of a material, such as metal, which has a higher efficient heat transfer so that the heat from the heating element (32) will be transferred through the plate (34) and not through the other plastic part of the container (31). Of course other materials are possible and it is not an absolute requirement that the container (31) or top (34) be made of different materials.

Figure 2:
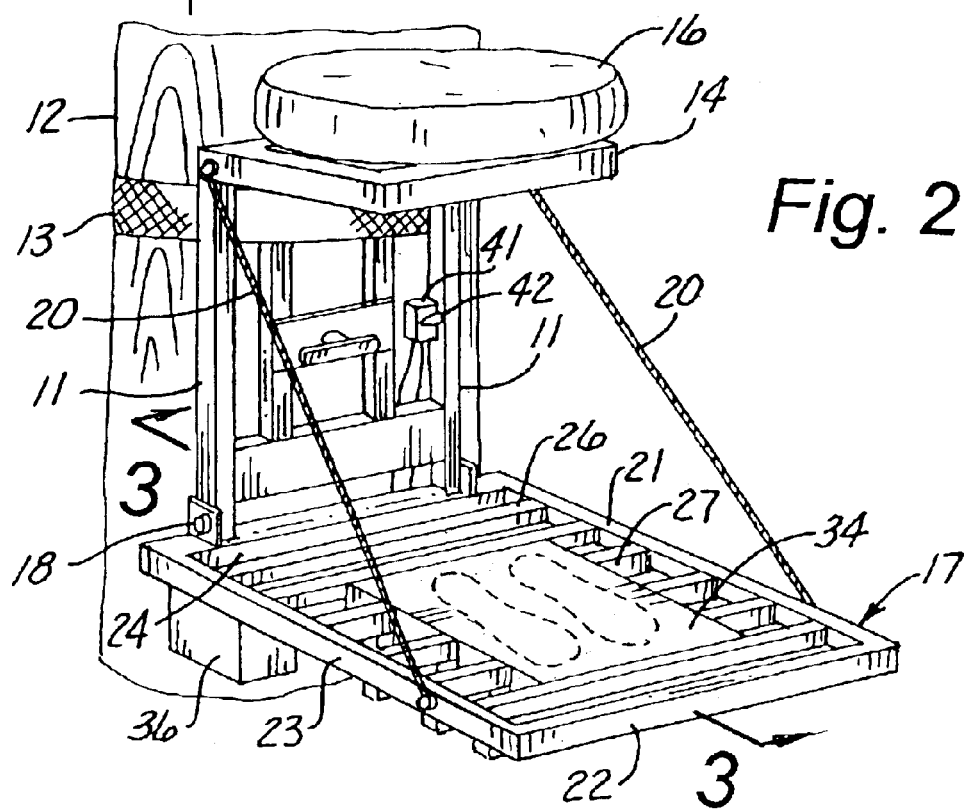
FIG. 2 is a perspective view similar to FIG. 1 without the hunter, but showing in dashed lines where a hunter's feet could be placed in a comfortable position on the platform.
Figure 3:
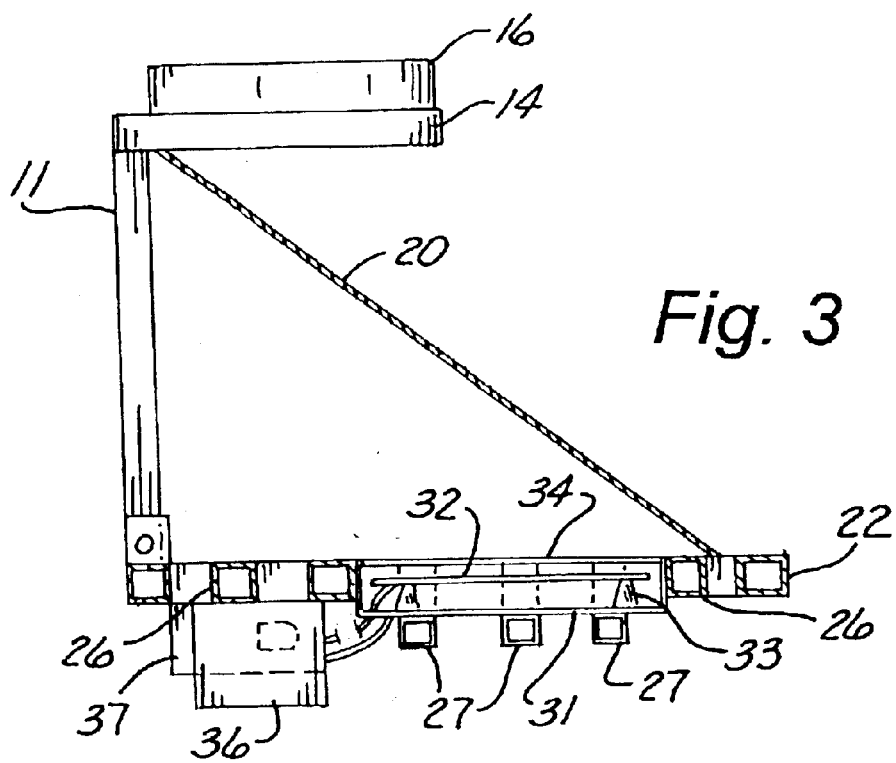
FIG. 3 is a cross sectional view taken along line 3—3 of FIG. 2.

Referring again to FIG. 4, it is noted that in operation the container (31) is placed into the recess formed by cross members (47). When assembled, preferably the top of structural elements (21)–(27) are in a same plane with the top (34), for example as shown in FIGS. 2 and 3. This is intended to be just one example of how a heat element can be disposed in a tree stand platform.

The heating element (32) is connected electrically to a battery (36), which is preferably of a re-chargeable type. A fixture (37) is attached to the tree stand (10). One of the best places for such attachment is to the underside of the platform (17), for example to cross members (26). The fixture could be attached, instead, to frame (11) if so desired. The place that the fixture (37) is not critical.

A male portion (38) of battery (36) is complementary to a female portion (39) of fixture (37) as is a common arrangement for portable small tools such as cordless hand drills or the like.

Cables (20) are attached at the top to the seat (14) and at the bottom to a front portion of the platform (17).

An optional feature of the present invention is the use of a switch (41) as shown in FIGS. 2 and 4. This switch (41) can be of any type but is shown as a toggle switch having a member (42) which can be moved between the solid line position shown and the dashed line position shown, one of such positions being in the "on" position whereby the battery will provide power to the heating element (32) and the other being the "off" position to disconnect the electrical connection between the heating element (32) and the battery (36). Wires (45) connect between the fixture (37) and the heating element (32). Another wire (43) leads from the fixture (37) to switch (41). Wire (44) leads from the switch (41) to the heating element (32).

In operation, a hunter typically will approach the tree stand by using a ladder or tree steps leading up to one side of the tree stand. In the present orientation, the best side for such approach would be the right side from the perspective of the hunter shown in FIG. 1. When the hunter decides to leave the tree stand, he will start down the ladder or steps connected to the tree (12), as shown in FIG. 1, and will pull the re-chargeable batter (36) out from the fixture (37) and take it home for re-charging in a re-charging receptacle (not shown).

Of course when the hunter returns to the tree stand and wishes to assume the position shown in FIG. 1, he will carry with him a fully charged battery (36) and it will be convenient to place the battery (36) in the fixture (37) as shown in FIGS. 1, 2 and 3, before stepping onto the tree stand platform (17).

If the platform is covered with ice or snow, the hunter can use the present invention to thaw the ice or snow, before standing on the platform, thereby making the tree stand a much safer place.

Although not shown, it is a common procedure that a hunter will wear a safety belt connected to the tree (12), such safety belt not being shown because it does not form a part of this invention. The hunter may also wish to carry with him extra recharged batteries (36). It is, however, within the scope of the present invention to use batteries which are not rechargeable.

Once the hunter is situated on the platform (17), and begins to be as motionless as possible in order to keep a deer or other big game from seeing him, if the weather is cold, his feet will eventually start to get cold. At that time, the hunter will move the switch (41) by its toggle or other control member (42) to the "on" position, thereby connecting the battery (36) to the heating element (32). With the hunter's feet approximately in the position shown in dashed lines in FIG. 2 on the top (34) of the container (31), heat from the heating element (32) will transferred through the lid (34), through the bottom of the hunter's boots, to keep the hunter's feet warm.

If the hunter's feet become warm enough, the hunter can throw the switch member (42) to the "off" position to conserve the energy of the battery (36) until heat is needed again.

Accordingly, it will be appreciated that the present invention does indeed accomplish the aforementioned objects. Obviously many modifications and variations of the present invention are possible in the light of the above teachings. It is therefore to be understood that, within the scope of the appended claims, the invention may be practiced otherwise than as specifically described.

What is claimed is:

1. The apparatus comprising
a tree stand including a platform having a front frame member, rear frame member and a pair of parallel side frame members forming a generally rectangular platform frame, and having a plurality of parallel cross members disposed at spaced locations on the platform frame wherein the cross members are disposed generally perpendicular to the side frame members, wherein middle portions of a selected plurality of said cross members define a U-shaped recess in the platform, and the platform is adapted to be attached to a free so that the platform is approximately horizontal whereby a hunter can stand on the platform;
a heating element generally centrally disposed on the platform and captively engaged in the U-shaped recess of said selected plurality of the cross members wherein the heating element is dimensioned to simultaneously accommodate both of the hunter's feet; and, an electric battery operatively attached to the heating element for causing the heating element to experience a significant rise in temperature.

2. The apparatus of claim 1 wherein the battery is rechargeable.

3. The apparatus of claim 2 including an electrical fixture operatively attached to the platform and to the heating element and whereby the battery and fixture have complementary mating structures whereby the battery can be easily plugged into the fixture for use or removed from the fixture for recharging.

4. The apparatus of claim 1 wherein the heating element is disposed in a removable container.

5. The apparatus of claim 4 wherein the top of the container is substantially in a plane coinciding with a plane defining the top surface of the platform.

6. The apparatus of claim 4 wherein the container is made of a material which has low heat transfer properties compared to metal.

7. The apparatus of claim 6 wherein the container is made of a plastic material.

8. The apparatus of claim 4 wherein the container has a top, a bottom and sides between the top and bottom which seal the container.

9. The apparatus of claim 8 wherein the top of the container has a higher heat transfer rate than the bottom or sides of the container whereby heat will be directed upwardly to the top so it can warm the hunter's feet.

10. The apparatus of claim 9 wherein the top of the container is constructed of metal and the sides and bottom of the container are constructed of a plastic material.

11. The apparatus of claim 1 including a switch operatively attached to the heating element for selectively turning the heating element on or off to conserve the energy of the battery when the hunter's feet are warm enough or on when heat is desired.

12. The apparatus of claim 5 wherein the top of the container is large enough to allow an adult hunter to have both feet entirely on said top of the container.

13. The apparatus of claim 2 wherein the battery, in an operative position, is disposed under the platform.

14. The apparatus of claim 13 wherein the battery is positioned to one side of the platform where it is convenient for a hunter to place the battery in a recharged condition when the hunter is moving upwardly towards a position on the platform.

15. The apparatus of claim 1 wherein the battery is of a rechargeable type.

* * * * *